United States Patent
Yoda et al.

(10) Patent No.: US 9,090,787 B2
(45) Date of Patent: *Jul. 28, 2015

(54) PHOTOCURABLE INK JET RECORDING INK COMPOSITION AND INK JET RECORDING METHOD

(75) Inventors: Toshiyuki Yoda, Matsumoto (JP); Hiroshi Fukumoto, Shiojiri (JP)

(73) Assignee: Seiko Epson Corporation, Suwa-shi (JP)

(*) Notice: Subject to any disclaimer, the term of this patent is extended or adjusted under 35 U.S.C. 154(b) by 243 days.

This patent is subject to a terminal disclaimer.

(21) Appl. No.: 13/611,095

(22) Filed: Sep. 12, 2012

(65) Prior Publication Data

US 2013/0063535 A1    Mar. 14, 2013

(30) Foreign Application Priority Data

Sep. 12, 2011   (JP) .................................. 2011-198184

(51) Int. Cl.
| | |
|---|---|
| B41J 2/01 | (2006.01) |
| C09D 11/101 | (2014.01) |
| B41J 2/21 | (2006.01) |
| C09D 11/30 | (2014.01) |

(52) U.S. Cl.
CPC ............. *C09D 11/101* (2013.01); *B41J 2/2107* (2013.01); *C09D 11/30* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00
USPC ......... 347/100, 95, 96, 101, 102, 105, 22, 21, 347/9; 523/160, 161
See application file for complete search history.

(56) References Cited

U.S. PATENT DOCUMENTS

| | | | |
|---|---|---|---|
| 4,507,466 A | 3/1985 | Tomalia et al. | |
| 4,558,120 A | 12/1985 | Tomalia et al. | |
| 4,568,737 A | 2/1986 | Tomalia et al. | |
| 4,587,329 A | 5/1986 | Tomalia et al. | |
| 4,631,337 A | 12/1986 | Tomalia et al. | |
| 4,694,064 A | 9/1987 | Tomalia et al. | |
| 5,041,516 A | 8/1991 | Frechet et al. | |
| 6,023,547 A | 2/2000 | Tortorello | |
| 6,310,115 B1 | 10/2001 | Vanmaele et al. | |
| 6,767,980 B2 | 7/2004 | Yurugi et al. | |
| 6,913,352 B2 | 7/2005 | Yoshihiro et al. | |
| 6,966,643 B2 | 11/2005 | Hale et al. | |
| 7,396,861 B2 | 7/2008 | Loccufier et al. | |
| 7,507,773 B2 | 3/2009 | Loccufier et al. | |
| 7,507,785 B2 | 3/2009 | Vanmaele et al. | |
| 7,538,144 B2 | 5/2009 | Vanmaele et al. | |
| 7,795,324 B2 | 9/2010 | Loccufier et al. | |
| 7,803,851 B2 | 9/2010 | Ishibashi et al. | |
| 7,875,698 B2 | 1/2011 | Vanmaele et al. | |
| 7,931,827 B2 | 4/2011 | Schneider et al. | |
| 8,158,214 B2 | 4/2012 | Fukumoto et al. | |
| 8,192,804 B2 | 6/2012 | Fukumoto et al. | |
| 8,470,904 B2 | 6/2013 | Sato et al. | |
| 2002/0065335 A1 | 5/2002 | Noguchi et al. | |
| 2002/0149659 A1 | 10/2002 | Wu et al. | |
| 2003/0199655 A1 | 10/2003 | Yurugi et al. | |
| 2004/0141040 A1 | 7/2004 | Nakajima | |
| 2004/0145639 A1 | 7/2004 | Noutary | |
| 2004/0166249 A1 | 8/2004 | Siegel | |
| 2006/0158493 A1 | 7/2006 | Nakano et al. | |
| 2006/0160917 A1 | 7/2006 | Oyanagi et al. | |
| 2007/0129457 A1 | 6/2007 | Nakano et al. | |
| 2007/0211111 A1 | 9/2007 | Hayata | |

(Continued)

FOREIGN PATENT DOCUMENTS

| | | |
|---|---|---|
| CN | 101163758 A | 4/2008 |
| CN | 101573387 A | 11/2009 |
| EP | 2 017 311 A1 | 1/2009 |
| EP | 2 053 103 A1 | 4/2009 |
| EP | 2 399 966 A1 | 12/2011 |
| JP | 11-302562 A | 11/1999 |
| JP | 3461501 B1 | 10/2003 |
| JP | 2004-067991 A | 3/2004 |
| JP | 2004-099796 A | 4/2004 |
| JP | 3544658 B2 | 7/2004 |

(Continued)

OTHER PUBLICATIONS

[No Author Listed] High lights! Radiation curing with resins and photoinitiators for industrial coatings and graphic arts: Laromer, Irgacure, Lucirin, Darocur. BASF SE. No publishing date available. 44 pages.

*Primary Examiner* — Manish S Shah
(74) *Attorney, Agent, or Firm* — Nutter McClennen & Fish LLP; John J. Penny, Jr.; Taylor M. Coon

(57) ABSTRACT

Provided is a photocurable ink jet recording ink composition having a low viscosity and excellent curing property and photopolymerization initiator solubility. The photocurable ink jet recording ink composition includes a polymerizable compound and a photopolymerization initiator. The polymerizable compound includes vinyl ether group-containing (meth)acrylic esters represented by Formula (I) in an amount of 20% by mass or more based on the total mass of the ink composition. The photopolymerization initiator includes a bisacylphosphine oxide photopolymerization initiator in an amount of 5% by mass or more based on the total mass of the ink composition and a thioxanthone photopolymerization initiator. The content ratio of the bisacylphosphine oxide photopolymerization initiator to the thioxanthone photopolymerization initiator is from 3:1 to 5:4.

12 Claims, No Drawings

(56) References Cited

U.S. PATENT DOCUMENTS

| | | |
|---|---|---|
| 2007/0249750 A1 | 10/2007 | Oyanagi et al. |
| 2008/0081119 A1 | 4/2008 | Oyanagi et al. |
| 2008/0090930 A1 | 4/2008 | Madhusoodhanan et al. |
| 2008/0108747 A1 | 5/2008 | Nakamura et al. |
| 2008/0166495 A1 | 7/2008 | Maeno et al. |
| 2008/0180503 A1 | 7/2008 | Umebayashi |
| 2008/0200578 A1 | 8/2008 | Noutary |
| 2009/0000508 A1 | 1/2009 | Edison et al. |
| 2009/0041946 A1 | 2/2009 | Fukumoto et al. |
| 2009/0099277 A1* | 4/2009 | Nagvekar et al. ............ 522/153 |
| 2009/0118388 A1 | 5/2009 | Naruse et al. |
| 2009/0197988 A1* | 8/2009 | Kito et al. ................. 522/26 |
| 2009/0280302 A1* | 11/2009 | Fukumoto et al. ............ 347/100 |
| 2010/0048756 A1 | 2/2010 | Loccufier et al. |
| 2010/0133728 A1 | 6/2010 | Yonezawa et al. |
| 2010/0313782 A1 | 12/2010 | Loccufier et al. |
| 2012/0069108 A1 | 3/2012 | Oyanagi et al. |
| 2012/0147095 A1 | 6/2012 | Miura et al. |
| 2012/0229583 A1 | 9/2012 | Fukumoto et al. |
| 2012/0252919 A1 | 10/2012 | Suzuki et al. |
| 2012/0274717 A1 | 11/2012 | Nakano et al. |
| 2013/0010039 A1 | 1/2013 | Kida et al. |
| 2014/0104356 A1 | 4/2014 | Kitade et al. |
| 2014/0160215 A1 | 6/2014 | Saito et al. |

FOREIGN PATENT DOCUMENTS

| | | |
|---|---|---|
| JP | 2004-224841 A | 8/2004 |
| JP | 2004-526820 A | 9/2004 |
| JP | 2006-028518 A | 2/2006 |
| JP | 2006-176734 A | 7/2006 |
| JP | 2006-199924 A | 8/2006 |
| JP | 2006-206875 A | 8/2006 |
| JP | 2006-232989 A | 9/2006 |
| JP | 2007-083509 A | 4/2007 |
| JP | 2007-100054 A | 4/2007 |
| JP | 2007-136988 A | 6/2007 |
| JP | 2007-182536 A | 7/2007 |
| JP | 2007-314744 A | 12/2007 |
| JP | 2007-314775 A | 12/2007 |
| JP | 2008-019292 A | 1/2008 |
| JP | 2008-507598 A | 3/2008 |
| JP | 2008-120991 A | 5/2008 |
| JP | 2008-179136 A | 8/2008 |
| JP | 2008-280383 A | 11/2008 |
| JP | 4204333 B2 | 1/2009 |
| JP | 2009-057548 A | 3/2009 |
| JP | 2009-062541 A | 3/2009 |
| JP | 2009-096910 A | 5/2009 |
| JP | 2009-226863 A | 10/2009 |
| JP | 2010-157706 A | 7/2010 |
| JP | 2011-500932 A | 1/2011 |
| JP | 2011-502188 A | 1/2011 |
| JP | 2012-207084 A | 10/2012 |
| JP | 2013-053208 A | 3/2013 |
| WO | 03/089486 A1 | 10/2003 |
| WO | 2009/053305 A1 | 4/2009 |
| WO | 2011/076703 A1 | 6/2011 |
| WO | 2012/172973 A1 | 12/2012 |
| WO | 2012/172974 A1 | 12/2012 |

* cited by examiner

PHOTOCURABLE INK JET RECORDING INK COMPOSITION AND INK JET RECORDING METHOD

BACKGROUND

1. Technical Field

The present invention relates to a photocurable ink jet recording ink composition and an ink jet recording method.

2. Related Art

Various systems have been utilized as recording methods of forming images on recording media such as paper based on image data signals. Among them, an ink jet system is an inexpensive apparatus and directly forms an image on a recording medium by discharging inks on a necessary image area only and therefore efficiently uses inks at low running cost. In addition, the ink jet system is low in noise and is therefore excellent as a recording method.

Recently, in the recording method of the ink jet system, a photocurable ink composition, which is cured by light irradiation, is used as an ink composition that can provide high water resistance, solvent resistance, abrasion resistance, etc.

For example, JP-A-11-302562 discloses a photocurable paint composition that contains 0.1 to 20 parts by weight of a thioxanthone photopolymerization initiator and 1 to 20 parts by weight of an acylphosphine or benzophenone photoradical generator based on 100 parts by weight of a coating film-forming binder component composed of 20 to 40% by weight of an acryloyl group-containing polyester oligomer having a number-average molecular weight of 2400 to 3150 or bisphenol A epoxyacrylate, 20 to 40% by weight of N-acryloylmorpholine, and 10% by weight of pentaerythritol triacrylate or dipentaerythritol hexaacrylate.

Unfortunately, when the photocurable paint composition described in JP-A-11-302562 is applied to ink jet recording, the composition causes problems, i.e., deterioration in discharge stability, deterioration in storage stability due to poor solubility of the photopolymerization initiator, and deterioration in curing property.

SUMMARY

An advantage of some aspects of the invention is to provide a photocurable ink jet recording ink composition having excellent curing property and photopolymerization initiator solubility.

In general, a photocurable ink composition contains a polymerizable compound and a photopolymerization initiator. First, the inventors have investigated polymerizable compounds from the viewpoint of obtaining an ink having a low viscosity and an excellent curing property and have found that use of a predetermined amount of certain vinyl ether group-containing (meth)acrylic esters is effective. Secondly, the inventors have investigated photopolymerization initiators from the viewpoint of obtaining an ink having an excellent curing property and have found that use of a predetermined amount of a bisacylphosphine oxide photopolymerization initiator is effective. In inks merely containing these components, however, the solubility of the bisacylphosphine oxide photopolymerization initiator is low, and the curing property is not enhanced to a practical level.

The inventors have conducted further investigation and have found that the above-mentioned problems can be solved by adding, to a photocurable ink jet recording ink composition containing the bisacylphosphine oxide photopolymerization initiator, a thioxanthone photopolymerization initiator in an amount of a predetermined content ratio range with the bisacylphosphine oxide photopolymerization initiator. The composition has excellent curing property and photopolymerization initiator solubility. Thus, the invention has been accomplished.

That is, the invention includes the following aspects.

[1] A photocurable ink jet recording ink composition including a polymerizable compound and a photopolymerization initiator, wherein the polymerizable compound includes: vinyl ether group-containing (meth)acrylic esters represented by the following Formula (I):

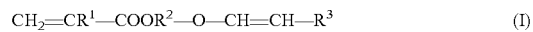
$$CH_2=CR^1-COOR^2-O-CH=CH-R^3 \qquad (I)$$

(wherein, $R^1$ represents a hydrogen atom or a methyl group; $R^2$ represents a divalent organic residue having 2 to 20 carbon atoms; and $R^3$ represents a hydrogen atom or a monovalent organic residue having 1 to 11 carbon atoms) in an amount of 20% by mass or more based on the total mass of the ink composition; and the photopolymerization initiator includes a bisacylphosphine oxide photopolymerization initiator in an amount of 5% by mass or more based on the total mass of the ink composition and a thioxanthone photopolymerization initiator, wherein the content ratio of the bisacylphosphine oxide photopolymerization initiator to the thioxanthone photopolymerization initiator is from 3:1 to 5:4 by mass standard.

[2] The photocurable ink jet recording ink composition according to aspect [1], wherein the thioxanthone photopolymerization initiator is at least one of 2,4-diethylthioxanthone and 2-isopropylthioxanthone.

[3] The photocurable ink jet recording ink composition according to aspect [1] or [2], wherein the content of the thioxanthone photopolymerization initiator is 4% by mass or less based on the total mass of the ink composition.

[4] The photocurable ink jet recording ink composition according to any one of aspects [1] to [3], wherein the bisacylphosphine oxide photopolymerization initiator is bis(2,4,6-trimethylbenzoyl)-phenylphosphine oxide.

[5] The photocurable ink jet recording ink composition according to any one of aspects [1] to [4], wherein the polymerizable compound further includes phenoxyethyl (meth)acrylate in an amount of less than 30% by mass based on the total mass of the ink composition.

[6] The photocurable ink jet recording ink composition according to any one of aspects [1] to [5], wherein the vinyl ether group-containing (meth)acrylic esters are 2-(vinyloxyethoxy)ethyl acrylate.

[7] An ink jet recording method including: discharging a photocurable ink jet recording ink composition according to any one of aspects [1] to [6] onto a recording medium; and curing the discharged ink composition by irradiating the ink composition with ultraviolet light having an emission peak wavelength in a range of 350 to 420 nm using an LED.

DESCRIPTION OF EXEMPLARY EMBODIMENTS

Embodiments according to the invention will now be described in detail. The invention is not limited to the following embodiments, and various modifications can be made within the scope of the invention.

Throughout the specification, the term "(meth)acrylate" refers to acrylate and/or methacrylate corresponding to the acrylate, and "(meth)acrylic" refers to acrylic and/or methacrylic corresponding to the acrylic.

Throughout the specification, the term "curing property" refers to a property of curing upon exposure to light. The term "color stability" refers to a property that the L*a*b* in the CIE Lab (L*a*b* color system) immediately after printing hardly changes with passage of time. The term "discharge stability" refers to a property that discharge of ink droplets from a nozzle is constantly stable without clogging of the nozzle. The term of "storage stability" refers to a property that no precipitate is observed when an ink is stored at −20° C. for four days or a property that no increase in viscosity is observed when an ink is stored at 60° C. for seven days.

Photocurable Ink Jet Recording Ink Composition

The photocurable ink jet recording ink composition (hereinafter, also simply referred to as "ink composition") according to an embodiment of the invention includes a polymerizable compound and a photopolymerization initiator. The polymerizable compound includes vinyl ether group-containing (meth)acrylic esters represented by the following Formula (I):

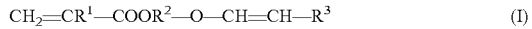

$$CH_2=CR^1-COOR^2-O-CH=CH-R^3 \qquad (I)$$

(wherein, $R^1$ represents a hydrogen atom or a methyl group; $R^2$ represents a divalent organic residue having 2 to 20 carbon atoms; and $R^3$ represents a hydrogen atom or a monovalent organic residue having 1 to 11 carbon atoms) in an amount of 20% by mass or more based on the total mass of the ink composition. The photopolymerization initiator includes a bisacylphosphine oxide photopolymerization initiator in an amount of 5% by mass or more based on the total mass of the ink composition and a thioxanthone photopolymerization initiator. The content ratio of the bisacylphosphine oxide photopolymerization initiator to the thioxanthone photopolymerization initiator (the former:the latter) is from 3:1 to 5:4 by mass standard.

Additives (components) that are contained or optionally contained in the ink composition of the embodiment will now be described.

Polymerizable Compounds

The polymerizable compound contained in the ink composition of the embodiment polymerizes by the effect of the photopolymerization initiator described below when irradiated with ultraviolet light to harden the printed ink.

Vinyl Ether Group-Containing (Meth)Acrylic Esters

The vinyl ether group-containing (meth)acrylic esters, which are the polymerizable compound indispensable in the embodiment, are represented by Formula (I).

An ink composition containing the vinyl ether group-containing (meth)acrylic esters can decrease the viscosity of an ink to make the curing property of the ink satisfactory.

In Formula (I), the divalent organic residue having 2 to 20 carbon atoms represented by $R^2$ is preferably a linear, branched, or circular alkylene group having 2 to 20 carbon atoms; an alkylene group having 2 to 20 carbon atoms and having an oxygen atom by an ether bond and/or an ester bond in its structure; or an optionally substituted divalent aromatic group having 6 to 11 carbon atoms. Among them, more preferred are alkylene groups having 2 to 6 carbon atoms, such as ethylene, n-propylene, isopropylene, and butylene groups; and alkylene groups having 2 to 9 carbon atoms and having an oxygen atom by an ether bond in its structure, such as oxyethylene, oxy-n-propylene, oxyisopropylene, and oxybutylene groups.

In Formula (I), the monovalent organic residue having 1 to 11 carbon atoms represented by $R^3$ is preferably a linear, branched, or circular alkyl group having 1 to 10 carbon atoms or an optionally substituted aromatic group having 6 to 11 carbon atoms. Among them, more preferred are alkyl groups having one or two carbon atoms, such as methyl and ethyl groups; and aromatic groups having 6 to 8 carbon atoms, such as phenyl and benzyl groups.

When the organic residues are groups optionally having substituents, the substituents are classified into groups containing carbon atoms and groups not containing carbon atoms. In the case of a substituent containing a carbon atom, the carbon atom is counted as the carbon atom of the organic residue. Examples of the group containing a carbon atom include, but not limited to, carboxyl and alkoxy groups. Examples of the group not containing a carbon atom include, but not limited to, hydroxyl and halo groups.

Examples of the vinyl ether group-containing (meth)acrylic esters include, but not limited to, 2-vinyloxyethyl (meth)acrylate, 3-vinyloxypropyl (meth)acrylate, 1-methyl-2-vinyloxyethyl (meth)acrylate, 2-vinyloxypropyl (meth)acrylate, 4-vinyloxybutyl (meth)acrylate, 1-methyl-3-vinyloxypropyl (meth)acrylate, 1-vinyloxymethylpropyl (meth)acrylate, 2-methyl-3-vinyloxypropyl (meth)acrylate, 1,1-dimethyl-2-vinyloxyethyl (meth)acrylate, 3-vinyloxybutyl (meth)acrylate, 1-methyl-2-vinyloxypropyl (meth)acrylate, 2-vinyloxybutyl (meth)acrylate, 4-vinyloxycyclohexyl (meth)acrylate, 6-vinyloxyhexyl (meth)acrylate, 4-vinyloxymethylcyclohexylmethyl (meth)acrylate, 3-vinyloxymethylcyclohexylmethyl (meth)acrylate, 2-vinyloxymethylcyclohexylmethyl (meth)acrylate, p-vinyloxymethylphenylmethyl (meth)acrylate, m-vinyloxymethylphenylmethyl (meth)acrylate, o-vinyloxymethylphenylmethyl (meth)acrylate, 2-(vinyloxyethoxy)ethyl (meth)acrylate, 2-(vinyloxyisopropoxy)ethyl (meth)acrylate, 2-(vinyloxyethoxy)propyl (meth)acrylate, 2-(vinyloxyethoxy)isopropyl (meth)acrylate, 2-(vinyloxyisopropoxy)propyl (meth)acrylate, 2-(vinyloxyisopropoxy)isopropyl (meth)acrylate, 2-(vinyloxyethoxyethoxy)ethyl (meth)acrylate, 2-(vinyloxyethoxyisopropoxy)ethyl (meth)acrylate, 2-(vinyloxyisopropoxyethoxy)ethyl (meth)acrylate, 2-(vinyloxyisopropoxyisopropoxy)ethyl (meth)acrylate, 2-(vinyloxyethoxyethoxy)propyl (meth)acrylate, 2-(vinyloxyethoxyisopropoxy)propyl (meth)acrylate, 2-(vinyloxyisopropoxyethoxy)propyl (meth)acrylate, 2-(vinyloxyisopropoxyisopropoxy)propyl (meth)acrylate, 2-(vinyloxyethoxyethoxy)isopropyl (meth)acrylate, 2-(vinyloxyethoxyisopropoxy)isopropyl (meth)acrylate, 2-(vinyloxyisopropoxyethoxy)isopropyl (meth)acrylate, 2-(vinyloxyisopropoxyisopropoxy)isopropyl (meth)acrylate, 2-(vinyloxyethoxyethoxyethoxy)ethyl (meth)acrylate, 2-(vinyloxyethoxyethoxyethoxy)ethyl (meth)acrylate, 2-(isopropenoxyethoxy)ethyl (meth)acrylate, 2-(isopropenoxyethoxyethoxy)ethyl (meth)acrylate, 2-(isopropenoxyethoxyethoxy)ethyl (meth)acrylate, 2-(isopropenoxyethoxyethoxyethoxy)ethyl (meth)acrylate, polyethylene glycol monovinyl ether (meth)acrylate, and polypropylene glycol monovinyl ether (meth)acrylate.

Among them, 2-(vinyloxyethoxy)ethyl (meth)acrylate, i.e., 2-(vinyloxyethoxy)ethyl acrylate and 2-(vinyloxyethoxy)ethyl methacrylate can notably decrease the viscosity of an ink, have high flash points, and can provide an excellent curing property to an ink and are therefore preferred. 2-(Vinyloxyethoxy)ethyl acrylate is more preferred. 2-(Vinyloxyethoxy)ethyl (meth)acrylate includes 2-(2-vinyloxyethoxy)ethyl (meth)acrylate and 2-(1-vinyloxyethoxy)ethyl (meth)acrylate. 2-(Vinyloxyethoxy)ethyl acrylate includes 2-(2-vinyloxyethoxy)ethyl acrylate and 2-(1-vinyloxyethoxy)ethyl acrylate. 2-(Vinyloxyethoxy)ethyl acrylate is superior to 2-(vinyloxyethoxy)ethyl methacrylate in the light of curing property.

The content of the vinyl ether group-containing (meth)acrylic esters is preferably 20% by mass or more, more preferably 20 to 80% by mass, more preferably 20 to 50% by mass, more preferably 20 to 40% by mass, and most preferably 20 to 30% by mass, based on the total mass (100% by mass) of the ink composition. Within the content range above, the viscosity of the ink composition can be maintained low, and also the ink composition can have an excellent curing property. In view of also maintaining the viscosity of the ink composition to be further low, the content is preferably 50 to 80% by mass, more preferably 50 to 70% by mass, and most preferably 60 to 70% by mass.

Examples of the method of producing the vinyl ether group-containing (meth)acrylic esters include, but not limited to, esterification of (meth)acrylic acid and a hydroxyl group-containing vinyl ether (process B); esterification of a (meth)acrylic acid halide and a hydroxyl group-containing vinyl ether (process C); esterification of a (meth)acrylic anhydride and a hydroxyl group-containing vinyl ether (process D); ester exchange of a (meth)acrylic ester and a hydroxyl group-containing vinyl ether (process E); esterification of (meth)acrylic acid and a halogen-containing vinyl ether (process F); esterification of an alkaline (earth) metal salt of (meth)acrylic acid and a halogen-containing vinyl ether (process G); vinyl exchange of a hydroxyl group-containing (meth)acrylic ester and a vinyl carboxylate (process H); and ether exchange of a hydroxyl group-containing (meth)acrylic ester and an alkyl vinyl ether (process I).

Among these methods, process E can further exhibit the effects desired in the embodiment and is therefore preferred.

Polymerizable Compound Other than Vinyl Ether Group-Containing (Meth)Acrylic Esters In addition to the vinyl ether group-containing (meth) acrylic esters, the ink composition may further contain various known monomers and oligomers, such as monofunctional, difunctional, and tri- or more-functional monomers and oligomers (hereinafter, referred to as "other polymerizable compound"). Examples of the monomer include unsaturated carboxylic acids (e.g., (meth)acrylic acid, itaconic acid, crotonic acid, isocrotonic acid, and maleic acid) and salts and esters thereof, urethanes, amides and anhydrides thereof, acrylonitrile, styrene, various unsaturated polyesters, unsaturated polyethers, unsaturated polyamides, and unsaturated urethanes. Examples of the oligomer include oligomers formed from the monomers mentioned above (e.g., linear acrylic oligomers), epoxy (meth)acrylate, oxetane (meth) acrylate, aliphatic urethane (meth)acrylate, aromatic urethane (meth)acrylate, and polyester (meth)acrylate.

As the other monofunctional monomer or multifunctional monomer, an N-vinyl compound may be contained in the ink composition. Examples of the N-vinyl compound include N-vinyl formamide, N-vinyl carbazole, N-vinyl acetamide, N-vinyl pyrrolidone, N-vinylcaprolactam, and acryloylmorpholine, and derivatives thereof.

Among other polymerizable compounds, ester of (meth) acrylic acid, i.e., (meth)acrylate is preferable.

In the (meth)acrylates mentioned above, examples of the monofunctional (meth)acrylate include isoamyl (meth)acrylate, stearyl (meth)acrylate, lauryl (meth)acrylate, octyl (meth)acrylate, decyl (meth)acrylate, isomyristyl (meth) acrylate, isostearyl (meth)acrylate, 2-ethylhexyl-diglycol (meth)acrylate, 2-hydroxybutyl (meth)acrylate, butoxyethyl (meth)acrylate, ethoxydiethylene glycol (meth)acrylate, methoxydiethylene glycol (meth)acrylate, methoxypolyethylene glycol (meth)acrylate, methoxypropylene glycol (meth)acrylate, phenoxyethyl (meth)acrylate, tetrahydrofurfuryl (meth)acrylate, isobornyl (meth)acrylate, 2-hydroxyethyl (meth)acrylate, 2-hydroxypropyl (meth)acrylate, 2-hydroxy-3-phenoxypropyl (meth)acrylate, lactone-modified flexible (meth)acrylate, t-butylcyclohexyl (meth)acrylate, dicyclopentanyl (meth)acrylate, and dicyclopentenyloxyethyl (meth)acrylate. Among these monofunctional (meth) acrylates, phenoxyethyl (meth)acrylate exhibits good compatibility with additives and is therefore preferred, in particular, phenoxyethyl acrylate is preferred.

In the (meth)acrylates mentioned above, examples of the difunctional (meth)acrylate include triethylene di(meth)acrylate, tetraethylene glycol di(meth)acrylate, polyethylene glycol di(meth)acrylate, dipropylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol-tricyclodecane di(meth)acrylate, EO (ethylene oxide) adduct di(meth) acrylate of bisphenol A, PO (propylene oxide) adduct di(meth)acrylate of bisphenol A, hydroxypivalic acid neopentyl glycol di(meth)acrylate, and polytetramethylene glycol di(meth)acrylate. Among these difunctional (meth)acrylates, dipropylene glycol di(meth)acrylate can provide a tough coating film and a low viscosity and is therefore preferred.

In the (meth)acrylates mentioned above, examples of the tri- or more-functional (meth)acrylate include trimethylolpropane tri(meth)acrylate, EO-modified trimethylolpropane tri(meth)acrylate, pentaerythritol tri(meth)acrylate, pentaerythritol tetra(meth)acrylate, dipentaerythritol hexa(meth) acrylate, ditrimethylolpropane tetra(meth)acrylate, glycerin propoxy tri(meth)acrylate, caprolactone-modified trimethylolpropane tri(meth)acrylate, pentaerythritolethoxy tetra (meth)acrylate, and caprolactam-modified dipentaerythritol hexa(meth)acrylate. Among these multifunctional (meth) acrylates, trimethylolpropane tri(meth)acrylate can provide a tough coating film and a low viscosity and is therefore preferred.

Among these compounds, the other polymerizable compound preferably includes a monofunctional (meth)acrylate. In such a case, the ink composition can have a low viscosity and excellent storage stability, and excellent discharge stability can be easily obtained in ink jet recording. Furthermore, a combination use of a monofunctional (meth)acrylate and a difunctional (meth)acrylate increases the toughness, heat resistance, and chemical resistance of a coating film and is therefore preferred.

The monofunctional (meth)acrylate preferably has one or more skeletons selected from the group consisting of aromatic ring skeletons, saturated alicyclic skeletons, and unsaturated alicyclic skeletons. When the other polymerizable compound is the monofunctional (meth)acrylate having the skeleton mentioned above, the ink composition can have a low viscosity.

Examples of the monofunctional (meth)acrylate having an aromatic ring skeleton include phenoxyethyl (meth)acrylate and 2-hydroxy-3-phenoxypropyl (meth)acrylate. Examples of the monofunctional (meth)acrylate having a saturated alicyclic skeleton include isobornyl (meth)acrylate, t-butylcyclohexyl (meth)acrylate, and dicyclopentanyl (meth)acrylate. Examples of the monofunctional (meth)acrylate having an unsaturated alicyclic skeleton include dicyclopentenyloxyethyl (meth)acrylate.

Among these compounds, phenoxyethyl (meth)acrylate and isobornyl (meth)acrylate can reduce viscosity and odor and are therefore preferred. In particular, phenoxyethyl (meth)acrylate is more preferred, and phenoxyethyl acrylate is further preferred.

When the ink composition of the embodiment contains a polymerizable compound in addition to the vinyl ether group-containing (meth)acrylic esters, the content of the polymerizable compound is preferably 40% by mass or less, more preferably 20 to 40% by mass, based on the total mass (100% by mass) of the ink composition. Within the content range above, the solubility of additives is excellent, and a coating film can have high toughness, heat resistance, and chemical resistance.

In particular, when the ink composition of the embodiment contains phenoxyethyl (meth)acrylate, the content of the phenoxyethyl (meth)acrylate is preferably less than 30% by mass, more preferably 5% by mass or more and less than 30% by mass, more preferably 10% by mass or more and less than 30% by mass, and most preferably 10 to 25% by mass, based on the total mass (100% by mass) of the ink composition. Within the content range above, the viscosity of the ink composition can be maintained low, and also the ink composition can have an excellent curing property.

The above-mentioned polymerizable compounds may be used alone or in a combination of two or more thereof.

Photopolymerization Initiator

The photopolymerization initiator contained in the ink composition of the embodiment allows an ink present on a recording medium surface to cure by photopolymerization due to ultraviolet light irradiation to achieve printing. In radiation, ultraviolet (UV) is excellent in safety, and the light source lamp thereof is inexpensive.

Bisacylphosphine Oxide Photopolymerization Initiator

The photopolymerization initiator in the embodiment indispensably contains a bisacylphosphine oxide photopolymerization initiator. In an ink composition containing the bisacylphosphine oxide photopolymerization initiator according to the embodiment, the curing property and the color stability of the ink composition are enhanced in connection with the polymerizable compound in the embodiment.

Any bisacylphosphine oxide photopolymerization initiator can be used, and examples thereof include bis(2,4,6-trimethylbenzoyl)-phenylphosphine oxide and bis(2,6-dimethoxybenzoyl)-2,4,4-trimethylpentylphosphine oxide.

Among these compounds, bis(2,4,6-trimethylbenzoyl)-phenylphosphine oxide has high reactivity to UV-LED light on the longer wavelength side and is therefore preferred.

Examples of commercially available bisacylphosphine oxide photopolymerization initiator include IRGACURE 819 (bis(2,4,6-trimethylbenzoyl)-phenylphosphine oxide), IRGACURE 1800 (mixture of CGI 403: IRGACURE 184=1: 3), and IRGACURE 1870 (mixture of CGI 403: IRGACURE 184=7:3) (each trade name manufactured by BASF).

The compound name of CGI 403 is bis(2,6-dimethoxybenzoyl)-2,4,4-trimethylpentylphosphine oxide. The compound name of IRGACURE 184 is 1-hydroxycyclohexyl-phenyl ketone.

The ink composition may contain, in addition to the bisacylphosphine oxide photopolymerization initiator, a monoacylphosphine oxide photopolymerization initiator such as 2,4,6-trimethylbenzoyl diphenylphosphine oxide, 2,4,6-triethylbenzoyl diphenylphosphine oxide, or 2,4,6-triphenylbenzoyl diphenylphosphine oxide. Though the monoacylphosphine oxide photopolymerization initiator does not highly enhance the curing property of the ink composition compared to the bisacylphosphine oxide photopolymerization initiator, the curing property of the ink composition is further increased by adding the monoacylphosphine oxide photopolymerization initiator, in addition to the bisacylphosphine oxide photopolymerization initiator, to the ink composition. The solubility of the monoacylphosphine oxide photopolymerization initiator in an ink composition is higher than that of the bisacylphosphine oxide photopolymerization initiator, and, therefore, the ink composition can contain the monoacylphosphine oxide photopolymerization initiator without any problem.

The bisacylphosphine oxide photopolymerization initiators mentioned above may be used alone or in a combination of two or more thereof.

The content of the bisacylphosphine oxide photopolymerization initiator is 5% by mass or more, more preferably 5 to 10% by mass, more preferably 5 to 8% by mass, and most preferably 5.75 to 6.25% by mass, based on the total mass (100% by mass) of the ink composition. Within the content range above, the ink composition can have further excellent curing property and color stability.

Thioxanthone Photopolymerization Initiator

The photopolymerization initiator in the embodiment indispensably contains a thioxanthone photopolymerization initiator. In an ink composition containing the thioxanthone photopolymerization initiator according to the embodiment, the curing property of the ink composition is enhanced in connection with the polymerizable compound in the embodiment.

Any thioxanthone photopolymerization initiator can be used, and examples thereof include thioxanthone, 2-methylthioxanthone, 2,4-diethylthioxanthone (DETX), 2-isopropylthioxanthone (ITX), 2-chlorothioxanthone, and 2,4-diethylthioxanthone.

Among these compounds, 2,4-diethylthioxanthone and 2-isopropylthioxanthone have excellent reactivity to ultraviolet light in the longer wavelength region and is therefore preferred.

Examples of commercially available thioxanthone photopolymerization initiator include KAYACURE DETX-S (2,4-diethylthioxanthone), KAYACURE ITX (2-isopropylthioxanthone) (each trade name manufactured by Nippon Kayaku Co., Ltd.) and Quantacure CTX (manufactured by Aceto Chemical).

These thioxanthone photopolymerization initiators may be used alone or in a combination of two or more thereof.

The content of the thioxanthone photopolymerization initiator is preferably 4% by mass or less, more preferably 1 to 4% by mass, more preferably 1.5 to 4% by mass, and most preferably 2.0 to 3.5% by mass, based on the total mass (100% by mass) of the ink composition. Within the content range above, the ink composition can have further excellent color stability.

When an ink composition contains both the bisacylphosphine oxide photopolymerization initiator and the thioxanthone photopolymerization initiator in a predetermined content ratio range, the solubility of each inhibitor is higher than that when these inhibitors are contained alone in the ink composition, and also the curing property of the ink composition can be enhanced while maintaining a low viscosity of the ink composition. More specifically, the bisacylphosphine oxide photopolymerization initiator and the thioxanthone photopolymerization initiator contained in an ink composition at a predetermined content ratio serve as dissolution assistants for each other. This allows each of the initiators to be dissolved in the vinyl ether group-containing (meth) acrylic esters having a low viscosity in an amount exceeding the solubility when they are used alone. As a result, it is possible to provide an ink composition having a low viscosity and excellent curing property and storage stability and also having excellent color stability.

The predetermined range of the content ratio between the both initiators for expressing such excellent effects is from 3:1 to 5:4 by mass standard. That is, the ratio B/C of the content B of the bisacylphosphine oxide photopolymerization initiator based on the total mass (100% by mass) of the ink composition to the content C of the thioxanthone photopolymerization initiator based on the total mass (100% by mass) of the ink composition is 1.25 to 3. If the content ratio of the both is out of the predetermined range, the above-described high solubility of the photopolymerization initiators is not achieved, and the ink composition does not have such excellent curing property, storage stability, and color stability.

Other Photopolymerization Initiator

The ink composition according to the embodiment may contain a photopolymerization initiator other than the bisacylphosphine oxide photopolymerization initiator and the thioxanthone photopolymerization initiator. Any photopolymerization initiator can be used as such an additional photopolymerization initiator, and examples thereof include amine compounds such as triethanolamine, methyldiethanolamine, triisopropanolamine, 4,4'-dimethylaminobenzophenone, 4,4'-diethylaminobenzophenone, ethyl 2-dimethylaminobenzoate, ethyl 4-dimethylaminobenzoate, isoamyl 4-dimethylaminobenzoate, n-butoxyethyl 4-dimethylaminobenzoate, 2-ethylhexyl 4-dimethylaminobenzoate, and triphenylamine.

These additional photopolymerization initiators may be used alone or in a combination of two or more thereof. The content of such additional photopolymerization initiators in an ink composition can be the residue of the content of other additives (components) and therefore is not particularly restricted as long as the effects of the invention are not impaired.

Coloring Material

The ink composition of the embodiment may further contain a coloring material. The coloring material can be a pigment and/or a dye.

Pigment

In the embodiment, the use of a pigment as the coloring material can increase the light resistance of the ink composition. The pigment may be an inorganic pigment or an organic pigment.

As the inorganic pigment, for example, carbon blacks (e.g., C.I. Pigment Black 7), such as furnace black, lamp black, acetylene black, and channel black; iron oxide; and titanium oxide can be used.

Examples of the organic pigment include azo pigments, such as insoluble azo pigments, condensed azo pigments, azo lake, and chelate azo pigments; polycyclic pigments, such as phthalocyanine pigments, perylene and perinone pigments, anthraquinone pigments, quinacridone pigments, dioxane pigments, thioindigo pigments, isoindolinone pigments, and quinophthalone pigments; dye chelates (e.g., basic dye chelates and acid dye chelates); dye lakes (e.g., basic dye lakes and acid dye lakes); and nitro pigments, nitroso pigments, aniline black, and daylight fluorescent pigments.

More specifically, examples of the carbon black used in black inks include No. 2300, No. 900, MCF88, No. 33, No. 40, No. 45, No. 52, MA7, MA8, MA100, and No. 2200B (each trade name manufactured by Mitsubishi Chemical Corporation); Raven 5750, Raven 5250, Raven 5000, Raven 3500, Raven 1255, and Raven 700 (each trade name manufactured by Carbon Columbia); Regal 400R, Regal 330R, Regal 660R, Mogul L, Monarch 700, Monarch 800, Monarch 880, Monarch 900, Monarch 1000, Monarch 1100, Monarch 1300, and Monarch 1400 (each trade name manufactured by CABOT JAPAN K.K.); and Color Black FW1, Color Black FW2, Color Black FW2V, Color Black FW18, Color Black FW200, Color Black 5150, Color Black 5160, Color Black 5170, Printex 35, Printex U, Printex V, Printex 140U, Special Black 6, Special Black 5, Special Black 4A, and Special Black 4 (each trade name manufactured by Degussa).

Examples of the pigment used in white inks include C.I. Pigment White 6, 18, and 21.

Examples of the pigment used in yellow inks include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, and 180.

Examples of the pigment used in magenta inks include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, and 245; and C.I. Pigment Violet 19, 23, 32, 33, 36, 38, 43, and 50.

Examples of the pigment used in cyan inks include C.I. Pigment Blue 1, 2, 3, 15, 15:1, 15:2, 15:3, 15:34, 15:4, 16, 18, 22, 25, 60, 65, and 66; and C.I. Vat Blue 4 and 60.

Examples of the pigment other than magenta, cyan, and yellow pigments include C.I. Pigment Green 7 and 10; C.I. Pigment Brown 3, 5, 25, and 26; and C.I. Pigment Orange 1, 2, 5, 7, 13, 14, 15, 16, 24, 34, 36, 38, 40, 43, and 63.

These pigments may be used alone or in a combination of two or more thereof.

In the case of containing a pigment in the ink composition, the pigment preferably has an average particle diameter of 2 μm or less, more preferably 30 to 300 nm. Within the average particle diameter range above, the ink composition is provided with higher reliability, such as discharge stability, storage stability, and dispersion stability, and also can form an image with excellent image quality. Throughout the specification, the average particle diameter is measured by dynamic light scattering.

Dye

In the embodiment, the coloring material may be a dye. Any dye, such as acid dyes, direct dyes, reactive dyes, and basic dyes, can be used. Examples of the dye include C.I. Acid Yellow 17, 23, 42, 44, 79, and 142; C.I. Acid Red 52, 80, 82, 249, 254, and 289; C.I. Acid Blue 9, 45, and 249; C.I. Acid Black 1, 2, 24, and 94; C.I. Food Black 1 and 2; C.I. Direct Yellow 1, 12, 24, 33, 50, 55, 58, 86, 132, 142, 144, and 173; C.I. Direct Red 1, 4, 9, 80, 81, 225, and 227; C.I. Direct Blue 1, 2, 15, 71, 86, 87, 98, 165, 199, and 202; C.I. Direct Black 19, 38, 51, 71, 154, 168, 171, and 195; C.I. Reactive Red 14, 32, 55, 79, and 249; and C.I. Reactive Black 3, 4, and 35.

These dyes may be used alone or in a combination of two or more thereof.

The content of the coloring material is preferably 1 to 20% by mass based on the total mass (100% by mass) of the ink composition. Within the content range, satisfactory color-developing properties can be obtained, and prevention of curing of a coating film due to light absorption by the coloring material itself can be decreased.

Dispersant

When the ink composition of the embodiment contains a pigment, the ink composition may further contain a dispersant for well dispersing the pigment. Any dispersant can be used. For example, a dispersant that is commonly used for preparing a pigment-dispersed liquid, such as a polymer dispersant, can be used. Specific examples of the dispersant include those of which main component is at least one selected from polyoxyalkylene polyalkylene polyamines, vinyl polymers and copolymers, acrylic polymers and copolymers, polyesters, polyamides, polyimides, polyurethanes, amino polymers, silicon-containing polymers, sulfur-containing polymers, fluorine-containing polymers, and epoxy resins. Examples of commercially available polymer dispersants include Ajisper series (trade name) manufactured by Ajinomoto Fine-Techno, Solsperse series (e.g., Solsperse 36000 (trade name) available from Avecia Co.), Disperbyk series (trade name) manufactured by BYK Chemie, and Disparlon series (trade name) manufactured by Kusumoto Chemicals.

Leveling Agent

The ink composition of the embodiment may further contain a leveling agent (surfactant), which improves wettability to a printing base material (recoding medium). Any leveling agent can be used. For example, silicone surfactants such as polyester-modified silicone and polyether-modified silicone can be used. Polyether-modified polydimethylsiloxane and polyester-modified polydimethylsiloxane are particularly preferred. Specific examples of the leveling agent include BYK-347, BYK-348, BYK-UV3500, 3510, 3530, and 3570 (each trade name manufactured by BYK Japan K.K.).

Polymerization Inhibitor

The ink composition of the embodiment may further contain a polymerization inhibitor for improving the storage stability of the ink composition. Any polymerization inhibitor can be used. For example, IRGASTAB UV10 and UV22 (each trade name manufactured by BASF) and hydroquinone monomethyl ether (MEHQ: a trade name manufactured by KANTO CHEMICAL CO., Inc.) can be used.

Other Additives

The ink composition of the embodiment may contain additives (components) in addition to the above-described additives. Such components are not particularly limited. For example, generally known penetration accelerator and wetting agent (moisturizing agent) and other additives can be used. Examples of the other additives include generally known fixing agents, antifungal agents, preservatives, antioxidants, UV absorbers, chelating agents, pH adjusters, and thickeners.

Furthermore, as described below, the ink composition of the embodiment can be cured by irradiation with light (ultraviolet light) having an emission peak wavelength in the range of 350 to 420 nm at an irradiation energy of 200 mJ/cm$^2$.

Recording Medium

The ink composition of the embodiment is discharged on a recording medium by a recording method described below to form a recorded matter. The recording medium may be absorbable or nonabsorbable. The ink jet recording method according to an embodiment described below can be widely applied to various recording media exhibiting highly different degrees of absorbability, i.e., from non-absorbing media into which aqueous inks hardly permeate to absorbing media into which aqueous inks easily permeate.

Any absorbing recording medium can be used, and examples thereof include plain paper such as electrophotographic paper into which aqueous inks easily permeate, ink jet paper (special paper for ink jet printing and having an ink absorbing layer composed of silica particles or alumina particles or an ink absorbing layer made of a hydrophilic polymer such as polyvinyl alcohol (PVA) or polyvinyl pyrrolidone (PVP)), and paper into which aqueous inks relatively hardly permeate and used in ordinary offset printing, such as art paper, coated paper, and cast-coated paper.

Any non-absorbing recording medium can be used, and examples thereof include films and plates of plastics such as polyvinyl chloride (PVC), polyethylene, polypropylene, and polyethylene terephthalate (PET); plates of metals such as iron, silver, copper, and aluminum; metal plates and plastic films coated with such various metals by vapor deposition; and plates of alloys such as stainless steel and brass.

Ink Jet Recording Method

An embodiment of the invention relates to an ink jet recording method. The photocurable ink jet recording ink composition according to the embodiment described above can be used in the recording method of this embodiment. The recording method includes a discharging step of discharging the above-described ink composition toward a recording medium; and a curing step of curing the ink composition discharged in the discharging step by irradiating the ink composition with ultraviolet light. The ink composition thus cured on the recording medium forms a coating film (cured film).

Discharging Step

In the discharging step, an ink composition is discharged onto a recording medium such that the ink composition adheres to the recording medium. The ink composition at the time of being discharged preferably has a viscosity of less than 11 mPa·s, more preferably 4 mPa·s or more and less than 11 mPa·s, more preferably 6 mPa·s or more and less than 11 mPa·s, and most preferably 10.6 to 10.9 mPa·s. In the case of an ink composition having such a viscosity at room temperature or in a non-heated state, the ink composition may be discharged at room temperature or without being heated. Alternatively, an ink composition may be heated to a predetermined temperature to adjust the viscosity to an appropriate level and may be then discharged. Thus, good discharge stability is achieved.

The ink composition of the embodiment has a higher viscosity than those of aqueous ink compositions to be used in ordinary ink jet recording inks. The viscosity therefore largely varies depending on changes in temperature when the ink composition is discharged. The change in viscosity of the ink highly affects the sizes of droplets and the droplet-discharging speed, which may cause deterioration in image quality. Accordingly, it is preferred to maintain the temperature of the ink when it is discharged as constant as possible.

Curing Step

Subsequently, the ink composition discharged and adhering to the recording medium is cured by irradiation with light (ultraviolet light) in the curing step. This is caused by that the photopolymerization initiator contained in the ink composition is decomposed by ultraviolet irradiation to generate initiation species such as radicals, acids, or bases and that polymerization of the polymerizable compound is accelerated by the function of the initiation species, or is caused by that polymerization of the polymerizable compound starts by ultraviolet irradiation. If the ink composition contains a sensitizing dye together with the photopolymerization initiator, the sensitizing dye in the system absorbs ultraviolet light and thereby changes to an excited state, which accelerates decomposition of the photopolymerization initiator by contact therewith. As a result, more sensitive curing reaction is achieved.

As the ultraviolet light source, a mercury lamp or a gas/solid laser is mainly used. As light sources for curing photocurable ink jet recording ink compositions, mercury lamps and metal halide lamps are widely used. From the viewpoint of environmental protection, however, it is currently highly desired to be mercury-free, and replacement by GaN-based semiconductor ultraviolet light emitting devices is very useful industrially and environmentally. In addition, ultraviolet light-emitting diodes (UV-LEDs) and ultraviolet light-emitting laser diodes (UV-LDs) are small-sized and have long life and high efficiency and are low in cost, and are therefore expected as light sources for photocurable ink jet recording. Among them, UV-LEDs are preferred.

It is preferable to use a photocurable ink composition that can be cured by irradiation using an LED preferably emitting light having an emission peak wavelength in a range of 350 to 420 nm, more preferably 390 to 400 nm, at an irradiation energy of preferably 200 mJ/cm² or less, more preferably 200 mJ/cm². In such a case, a high printing speed can be obtained at low cost. Such an ink composition can be obtained by containing a photopolymerization initiator that is decomposed by exposure to ultraviolet light having a wavelength in the above-mentioned range and/or a polymerizable compound that starts polymerization by exposure to ultraviolet light having a wavelength in the above-mentioned range.

Thus, according to the above-described two embodiments, it is possible to provide a photocurable ink jet recording ink composition that has excellent curing property, color stability, and solubility of a photopolymerization initiator and also has low viscosity and shows less odor and skin irritation and provide a recording method using the ink composition. The photocurable ink jet recording ink composition of the embodiment can show desired effects, in particular, in photocuring by irradiation with ultraviolet light having an emission peak wavelength in a range of 350 to 420 nm.

EXAMPLES

The embodiments of the invention will now be more specifically described by non-limiting examples.
Components
Components used in the following Examples and Comparative Examples are as follows.
Photopolymerization Initiator:
  IRGACURE 819 (bisacylphosphine oxide type, trade name manufactured by BASF, hereinafter abbreviated as "819"),
  KAYACURE DETX-S (thioxanthone type, trade name manufactured by Nippon Kayaku Co., Ltd., hereinafter abbreviated as "DETX-S"), and
  KAYACURE ITX (thioxanthone type, trade name manufactured by Nippon Kayaku Co., Ltd., hereinafter abbreviated as "ITX"),
Polymerizable Compound:
  VEEA (2-(2-vinyloxyethoxy)ethyl acrylate, trade name manufactured by Nippon Shokubai Co., Ltd., hereinafter abbreviated as "VEEA"),
  Viscoat #192 (phenoxyethyl acrylate, trade name manufactured by Osaka Organic Chemical Industry Ltd., hereinafter abbreviated as "PEA"), and
  APG-100 (dipropylene glycol diacrylate, trade name manufactured by Shin-Nakamura Chemical Co., Ltd., hereinafter abbreviated as "DPGDA"),
Pigment:
  NC-006 (Color index name: C.I. Pigment blue 15:3, trade name manufactured by Nikko Chem Tech Corporation, hereinafter abbreviated as "15:3"),
Dispersant:
  Solsperse 36000 (trade name manufactured by Lubrizol, hereinafter abbreviated as "Sol36000"),
Leveling Agent:
  Silicone surface conditioner BYK-UV3500 (trade name manufactured by BYK, hereinafter abbreviated as "UV3500"), and
Polymerization Inhibitor:
  MEHQ (hydroquinone monomethyl ether, trade name manufactured by Kanto Chemical Co., Inc., in Table 1, abbreviated as "MEHQ").

Examples 1 to 12 and Comparative Examples 1 to 14

The components shown in Tables 1 to 3 were mixed in the amounts (unit: % by mass) shown in Tables 1 to 3, and the mixtures were stirred with a high-speed water-cooled stirrer to obtain cyan ink compositions.

In Tables 1 to 3, in the column "B/C", "B" represents the amount of initiator B, i.e., bisacylphosphine oxide photopolymerization initiator ("819"), and "C" represents the amount of initiator C, i.e., thioxanthone photopolymerization initiator (total of "DETX-S" and "ITX"). A numerical value of "B/C" being in the range of 1.25 or more and 3 or less means that "B:C" is in the range of from 3:1 to 5:4.

TABLE 1

| Additive | Trade name | Example 1 | 2 | 3 | 4 | 5 | 6 | 7 | 8 | 9 | 10 | 11 | 12 |
|---|---|---|---|---|---|---|---|---|---|---|---|---|---|
| Initiator B | 819 | 6 | 6 | 6 | 6 | 5 | 5 | 5 | 6 | 6 | 6 | 6 | 6 |
| Initiator C | DETX-S | 3 | — | 4 | 2 | 2 | 4 | 1.7 | 3 | 3 | 3 | 3 | 3 |
|  | ITX | — | 3 | — | — | — | — | — | — | — | — | — | — |
| Polymerizable compound | VEEA | 50 | 50 | 50 | 50 | 50 | 50 | 50 | 60 | 70 | 55 | 20 | 45 |
|  | PEA | 25 | 25 | 25 | 25 | 25 | 25 | 25 | 15 | 10 | 20 | 35 | 30 |
|  | DPGDA | 9.9 | 9.9 | 8.9 | 10.9 | 11.9 | 9.9 | 12.2 | 9.9 | 4.9 | 9.9 | 29.9 | 9.9 |
| Coloring material | 15:3 | 2 | 2 | 2 | 2 | 2 | 2 | 2 | 2 | 2 | 2 | 2 | 2 |
| Dispersant | Sol36000 | 2 | 2 | 2 | 2 | 2 | 2 | 2 | 2 | 2 | 2 | 2 | 2 |
| Polymerization inhibitor | MEHQ | 1.6 | 1.6 | 1.6 | 1.6 | 1.6 | 1.6 | 1.6 | 1.6 | 1.6 | 1.6 | 1.6 | 1.6 |
| Leveling agent | UV3500 | 0.5 | 0.5 | 0.5 | 0.5 | 0.5 | 0.5 | 0.5 | 0.5 | 0.5 | 0.5 | 0.5 | 0.5 |
| Total |  | 100.0 | 100.0 | 100.0 | 100.0 | 100.0 | 100.0 | 100.0 | 100.0 | 100.0 | 100.0 | 100.0 | 100.0 |
| B/C |  | 2 | 2 | 1.5 | 3 | 2.5 | 1.25 | 2.94 | 2 | 2 | 2 | 2 | 2 |

TABLE 2

| Additive | Trade name | Comparative Example | | | | | | |
|---|---|---|---|---|---|---|---|---|
| | | 1 | 2 | 3 | 4 | 5 | 6 | 7 |
| Initiator B | 819 | 6 | 6 | 5 | 5 | 6 | 7 | 7 |
| Initiator C | DETX-S | 5 | 1 | 1 | 5 | — | — | — |
| | ITX | — | — | — | — | — | — | — |
| Polymerizable compound | VEEA | 50 | 50 | 50 | 50 | 50 | 50 | — |
| | PEA | 25 | 25 | 25 | 25 | 25 | 25 | 60 |
| | DPGDA | 7.9 | 11.9 | 12.9 | 8.9 | 12.9 | 11.9 | 26.9 |
| Coloring material | 15:3 | 2 | 2 | 2 | 2 | 2 | 2 | 2 |
| Dispersant | Sol36000 | 2 | 2 | 2 | 2 | 2 | 2 | 2 |
| Polymerization inhibitor | MEHQ | 1.6 | 1.6 | 1.6 | 1.6 | 1.6 | 1.6 | 1.6 |
| Leveling agent | UV3500 | 0.5 | 0.5 | 0.5 | 0.5 | 0.5 | 0.5 | 0.5 |
| Total | | 100.0 | 100.0 | 100.0 | 100.0 | 100.0 | 100.0 | 100.0 |
| B/C | | 1.20 | 6 | 5 | 1 | — | — | — |

TABLE 3

| Additive | Trade name | Comparative Example | | | | | | |
|---|---|---|---|---|---|---|---|---|
| | | 8 | 9 | 10 | 11 | 12 | 13 | 14 |
| Initiator B | 819 | 3 | — | — | — | 6 | — | 5.6 |
| Initiator C | DETX-S | 3 | 6 | 12 | 12 | 3 | 12 | 1.4 |
| | ITX | — | — | — | — | — | — | — |
| Polymerizable compound | VEEA | 50 | 50 | 50 | 52 | 10 | — | 50 |
| | PEA | 25 | 25 | 25 | 25 | 50 | 50 | 25 |
| | DPGDA | 12.9 | 12.9 | 6.9 | 4.9 | 24.9 | 31.9 | 11.9 |
| Coloring material | 15:3 | 2 | 2 | 2 | 2 | 2 | 2 | 2 |
| Dispersant | Sol36000 | 2 | 2 | 2 | 2 | 2 | 2 | 2 |
| Polymerization inhibitor | MEHQ | 1.6 | 1.6 | 1.6 | 1.6 | 1.6 | 1.6 | 1.6 |
| Leveling agent | UV3500 | 0.5 | 0.5 | 0.5 | 0.5 | 0.5 | 0.5 | 0.5 |
| Total | | 100.0 | 100.0 | 100.0 | 100.0 | 100.0 | 100.0 | 100.0 |
| B/C | | 1 | 0 | 0 | 0 | 2 | 0 | 4 |

Evaluation Items

1. Solubility of Photopolymerization Initiator

Each mixture of components excluding the pigment was visually observed for whether or not the photopolymerization initiators were completely dissolved in the process of dissolving the mixture by stirring (liquid temperature: 20° C.). The evaluation results are shown in Tables 4 to 6. The evaluation criteria are as follows:

A: no undissolved photopolymerization initiators were observed after the process of dissolving the mixture by stirring; and B: undissolved photopolymerization initiators were observed after the process of dissolving the mixture by stirring.

2. Viscosity

The viscosity of each ink composition prepared above was measured with a rheometer MCR300 (manufactured by Paar Physica) under conditions of a temperature of 20° C. and a number of revolutions of 200 rpm. The evaluation results are shown in Tables 4 to 6. The evaluation criteria are as follows:

A: less than 11 mPa·s, and

B: 11 mPa·s or more.

3. Curing Property

The respective nozzle arrays of an ink jet printer, PX-G5000 (trade name manufactured by Seiko Epson Corporation), were filled with the photocurable ink compositions prepared above. A solid pattern image (recording resolution: 720×720 dpi) was printed on a PET film (Rumirer 125E20 (trade name), manufactured by Panac Corporation) under ordinary temperature and ordinary pressure with a dot diameter of middle so that the printed matter has a thickness of 7 μm, and the solid pattern image was cured by irradiation with 200 mJ/cm$^2$ of ultraviolet light having a wavelength of 395 nm at an irradiation intensity of 1540 mW/cm$^2$ using a UV-LED in an ultraviolet irradiation device mounted on the side of a carriage. Thus, recorded matters of solid pattern images printed on PET films were produced. Here, the solid pattern image refers to an image formed of dots recorded for every pixel, which is a minimum recording unit region defined by recoding resolution.

The irradiation energy [mJ/cm$^2$] was determined as the product obtained by multiplying the irradiation intensity [mW/cm$^2$] on the surface irradiated with light from a light source by the irradiation duration time [s]. The irradiation intensity was measured using an ultraviolet ray intensity meter, UM-10, and a receptor head, UM-400 (both manufactured by Konica Minolta Sensing, Inc.).

Whether a coating film was in a tack-free state or not was determined based on the following conditions: whether an ink adhered to a cotton swab or not or whether a cured ink material on a recording medium was abraded or not. The cotton swab used was Johnson cotton swab manufactured by Johnson & Johnson. Each coating film was rubbed with the cotton swab back and forth 10 times under a load of 100 g.

The ink coating film (cured film) used for the curing property evaluation had a thickness of 7 μm. The evaluation results are shown in Tables 4 to 6, and the evaluation criteria are as follows:

A: no tack was observed on the surface, and

B: tack was observed on the surface.

4. Color Stability

The colors of the recorded matters prepared above were measured using the CIE Lab (L*a*b* color system). Specifically, the recorded matters were left to stand for seven days after recording and were measured for colors. The hue at this time was compared with that at 2 hours after the recording, and the difference (ΔE) in the hue was determined by the following expression:

$$\Delta E = (\Delta a^{*2} + \Delta b^{*2} + \Delta L^{*2})^{(1/2)}.$$

The evaluation results are shown in Tables 4 to 6, and the evaluation criteria are as follows:

A: ΔE was less than 1.5, and

B: ΔE was 1.5 or more.

TABLE 4

| | Example | | | | | | | | | | | |
|---|---|---|---|---|---|---|---|---|---|---|---|---|
| Evaluation item | 1 | 2 | 3 | 4 | 5 | 6 | 7 | 8 | 9 | 10 | 11 | 12 |
| Initiator solubility | A | A | A | A | A | A | A | A | A | A | A | A |
| Viscosity | A | A | A | A | A | A | A | A | A | A | B | B |
| Curing property | A | A | A | A | A | A | A | A | A | A | A | A |
| Color stability | A | A | A | A | A | A | A | A | A | A | A | A |

TABLE 5

| | Comparative Example | | | | | | |
|---|---|---|---|---|---|---|---|
| Evaluation item | 1 | 2 | 3 | 4 | 5 | 6 | 7 |
| Initiator solubility | B | B | B | B | B | B | A |
| Viscosity | A | A | A | A | A | A | B |
| Curing property | A | A | B | A | B | A | B |
| Color stability | B | A | A | B | A | A | A |

TABLE 6

| | Comparative Example | | | | | | |
|---|---|---|---|---|---|---|---|
| Evaluation item | 8 | 9 | 10 | 11 | 12 | 13 | 14 |
| Initiator solubility | A | A | B | B | A | A | B |
| Viscosity | A | A | A | A | B | A | A |
| Curing property | B | B | B | B | B | B | A |
| Color stability | A | B | B | B | A | B | A |

The results shown in Tables 4 to 6 reveal that the ink compositions (Examples 1 to 12) each containing a polymerizable compound and a photopolymerization initiator, where the polymerizable compound includes 50% by mass or more of vinyl ether group-containing (meth)acrylic esters represented by Formula (I), and the photopolymerization initiator includes a bisacylphosphine oxide type in an amount of 5% by mass or more and a thioxanthone type at a content ratio of from 3:1 to 5:4, have further excellent curing property and solubility of the photopolymerization initiator and equivalent or higher color stability compared with those of other ink compositions (Comparative Examples 1 to 14).

Furthermore, when the value of B/C in the item of "initiator solubility" is less than 1.25 or higher than 3 (which is out of the range of the content ratio of initiator B to initiator C of from 3:1 to 5:4), the photopolymerization initiator is not sufficiently dissolved.

The entire disclosure of Japanese Patent Application No. 2011-198184, filed Sep. 12, 2011 IS expressly incorporated by reference herein.

What is claimed is:

1. A photocurable ink jet recording ink composition comprising a polymerizable compound and a photopolymerization initiator, wherein
the polymerizable compound includes:
vinyl ether group-containing (meth)acrylic esters represented by the following Formula (I):

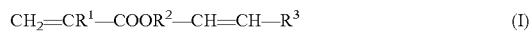 (I)

(wherein, $R^1$ represents a hydrogen atom or a methyl group; $R^2$ represents a divalent organic residue having 2 to 20 carbon atoms; and $R^3$ represents a hydrogen atom or a monovalent organic residue having 1 to 11 carbon atoms) in an amount of 20% by mass or more based on the total mass of the ink composition;
the polymerizable compound further includes at least one monymer wich is monofunctional, difunctional, or tri- or more-functional monomer other than the vinyl ether group-containing (meth)acrylate esters represented by the formula (I), in an amount of 40% by mass or less of the ink composition; and
the photopolymerization initiator includes a bisacylphosphine oxide photopolymerization initiator in an amount of 5% by mass or more based on the total mass of the ink composition and a thioxanthone photopolymerization initiator, wherein the content ratio of the bisacylphosphine oxide photopolymerization initiator to the thioxanthone photopolymerization initiator is from 3:1 to 5:4 by mass standard.

2. The photocurable ink jet recording ink composition according to claim 1, wherein the thioxanthone photopolymerization initiator is at least one of 2,4-diethylthioxanthone and 2-isopropylthioxanthone.

3. The photocurable ink jet recording ink composition according to claim 1, wherein the content of the thioxanthone photopolymerization initiator is 4% by mass or less based on the total mass of the ink composition.

4. The photocurable ink jet recording ink composition according to claim 1, wherein the bisacylphosphine oxide photopolymerization initiator is bis(2,4,6-trimethylbenzoyl)-phenylphosphine oxide.

5. The photocurable ink jet recording ink composition according to claim 1, wherein the polymerizable compound further includes phenoxyethyl (meth)acrylate in an amount of less than 30% by mass based on the total mass of the ink composition.

6. The photocurable ink jet recording ink composition according to claim 1, wherein the vinyl ether group-containing (meth)acrylic esters are 2-(vinyloxyethoxy)ethyl acrylate.

7. An ink jet recording method comprising:
discharging a photocurable ink jet recording ink composition according to claim 1 onto a recording medium; and
curing the discharged ink composition by irradiating the ink composition with ultraviolet light having an emission peak wavelength in a range of 350 to 420 nm using an LED.

8. An ink jet recording method comprising:
discharging a photocurable ink jet recording ink composition according to claim 2 onto a recording medium; and
curing the discharged ink composition by irradiating the ink composition with ultraviolet light having an emission peak wavelength in a range of 350 to 420 nm using an LED.

9. An ink jet recording method comprising:
discharging a photocurable ink jet recording ink composition according to claim 3 onto a recording medium; and
curing the discharged ink composition by irradiating the ink composition with ultraviolet light having an emission peak wavelength in a range of 350 to 420 nm using an LED.

10. An ink jet recording method comprising:
discharging a photocurable ink jet recording ink composition according to claim 4 onto a recording medium; and
curing the discharged ink composition by irradiating the ink composition with ultraviolet light having an emission peak wavelength in a range of 350 to 420 nm using an LED.

11. An ink jet recording method comprising:
discharging a photocurable ink jet recording ink composition according to claim 5 onto a recording medium; and
curing the discharged ink composition by irradiating the ink composition with ultraviolet light having an emission peak wavelength in a range of 350 to 420 nm using an LED.

12. An ink jet recording method comprising:
discharging a photocurable ink jet recording ink composition according to claim 6 onto a recording medium; and
curing the discharged ink composition by irradiating the ink composition with ultraviolet light having an emission peak wavelength in a range of 350 to 420 nm using an LED.

* * * * *